US012798237B2

(12) United States Patent
Okui

(10) Patent No.: US 12,798,237 B2
(45) Date of Patent: Nov. 17, 2026

(54) LIQUID EJECTING HEAD AND LIQUID EJECTING APPARATUS

(71) Applicant: SEIKO EPSON CORPORATION, Tokyo (JP)

(72) Inventor: Hiroaki Okui, Azumino (JP)

(73) Assignee: SEIKO EPSON CORPORATION (JP)

( * ) Notice: Subject to any disclaimer, the term of this patent is extended or adjusted under 35 U.S.C. 154(b) by 120 days.

(21) Appl. No.: 18/966,512

(22) Filed: Dec. 3, 2024

(65) Prior Publication Data

US 2025/0187334 A1 Jun. 12, 2025

(30) Foreign Application Priority Data

Dec. 6, 2023 (JP) ................................ 2023-205934

(51) Int. Cl.
*B41J 2/14* (2006.01)
*B41J 2/01* (2006.01)
*B41J 2/16* (2006.01)

(52) U.S. Cl.
CPC ............ *B41J 2/14233* (2013.01); *B41J 2/01* (2013.01); *B41J 2/14201* (2013.01); *B41J 2/161* (2013.01); *B41J 2/1623* (2013.01); *B41J 2/1626* (2013.01); *B41J 2/1631* (2013.01); *B41J 2/1634* (2013.01); *B41J 2/1637* (2013.01); *B41J 2/1643* (2013.01); *B41J 2002/14241* (2013.01); *B41J 2002/14362* (2013.01); *B41J 2002/14419* (2013.01); *B41J 2202/19* (2013.01); *B41J 2202/20* (2013.01)

(58) Field of Classification Search
CPC ...... B41J 2/14233; B41J 2/01; B41J 2/14201; B41J 2/161; B41J 2/1623; B41J 2/1626; B41J 2/1631; B41J 2/1634; B41J 2/1637; B41J 2/1643; B41J 2002/14241; B41J 2002/14362; B41J 2002/14419; B41J 2202/19; B41J 2202/20
See application file for complete search history.

(56) References Cited

U.S. PATENT DOCUMENTS

| | | | | |
|---|---|---|---|---|
| 2016/0221339 | A1* | 8/2016 | Togashi | B41J 2/14233 |
| 2017/0182776 | A1* | 6/2017 | Akahane | B41J 2/14209 |
| 2018/0086084 | A1* | 3/2018 | Kimura | B41J 2/175 |
| 2019/0381794 | A1* | 12/2019 | Watanabe | B41J 2/14 |
| 2021/0370673 | A1* | 12/2021 | Okui | B41J 2/14233 |
| 2022/0305785 | A1* | 9/2022 | Kanegae | B41J 2/14088 |

(Continued)

FOREIGN PATENT DOCUMENTS

JP 2021-053882 A 4/2021

*Primary Examiner* — Manish S Shah
(74) *Attorney, Agent, or Firm* — Harness, Dickey & Pierce, P.L.C.

(57) ABSTRACT

A liquid ejecting head includes: a head chip; a fixing plate having a first surface facing in an ejection direction, a second surface that is opposite from the first surface, and a lateral surface; and a holder configured to hold the head chip between itself and the fixing plate. In a plan view as seen toward the first surface, the first surface includes a water repellent region having water repellency, and a hydrophilic region that is disposed between the water repellent region and the lateral surface, and has lower water repellency than the water repellent region, and part of mold is bonded to the hydrophilic region of the first surface, the mold being disposed between the lateral surface and at least one of the head chip or the holder.

15 Claims, 9 Drawing Sheets

(56) References Cited

U.S. PATENT DOCUMENTS

| | | | | |
|---|---|---|---|---|
| 2022/0305788 | A1* | 9/2022 | Kanegae | B41J 2/15 |
| 2022/0355600 | A1* | 11/2022 | Hanaoka | B41J 2/14233 |
| 2023/0134134 | A1* | 5/2023 | Sugawara | B41J 2/1433<br>347/20 |
| 2024/0316929 | A1* | 9/2024 | Watanabe | B41J 2/14233 |

* cited by examiner

LIQUID EJECTING HEAD AND LIQUID EJECTING APPARATUS

The present application is based on, and claims priority from JP Application Serial Number 2023-205934, filed Dec. 6, 2023, the disclosure of which is hereby incorporated by reference herein in its entirety.

BACKGROUND

1. Technical Field

The present disclosure relates to a liquid ejecting head and a liquid ejecting apparatus.

2. Related Art

A known liquid ejecting head in related art includes: a plurality of head chips each having a nozzle plate in which a plurality of nozzles are formed; a fixing plate to which the plurality of head chips are fixed by an adhesive; and a holder that holds the plurality of head chips between itself and the fixing plate (JP-A-2021-53882). In related art, in the fixing plate, a liquid repellent film is formed on the surface thereof, and a plurality of exposure openings for exposing the nozzle plates to the outside are formed.

In related art, a water repellent film is formed on the surface of the fixing plate and the surface of the nozzle plate, and an adhesive as a mold is filled between the nozzle plate and the inner peripheral surface of the exposure opening of the fixing plate, and between the outer peripheral surface of the fixing plate and the inner peripheral surface of the outer peripheral wall of the holder. Hereinafter, when both the inner peripheral surface of the exposure opening of the fixing plate and the outer peripheral surface of the fixing plate are not distinguished, the peripheral surfaces may be referred to as the lateral surface of the fixing plate. Due to the water repellent film formed on the surfaces of the fixing plate and the nozzle plate, the adhesive is unlikely to adhere to these surfaces. Because the fixing plate is relatively thin, the bond strength between the lateral surface of the fixing plate and the adhesive as a mold is not high. Thus, liquid which has adhered to the mold may enter the inside of the liquid ejecting head through the bond interface between the mold and the inner peripheral surface of the exposure opening of the fixing plate or the outer peripheral surface of the fixing plate.

SUMMARY

According to a first aspect of the present disclosure, a liquid ejecting head is provided. The liquid ejecting head includes: a head chip configured to eject liquid in an ejection direction; a fixing plate having a first surface facing in the ejection direction, a second surface to which the head chip is fixed, and which is on an opposite side of the first surface, and a lateral surface that connects the first surface and the second surface; and a holder configured to hold the head chip between itself and the fixing plate. In a plan view as seen toward the first surface, the first surface includes a water repellent region having water repellency, and a hydrophilic region that is disposed between the water repellent region and the lateral surface, and has lower water repellency than the water repellent region, and part of mold is bonded to the hydrophilic region of the first surface, the mold being disposed between the lateral surface and at least one of the head chip or the holder.

According to a second aspect of the present disclosure, a liquid ejecting apparatus is provided. The liquid ejecting apparatus includes the liquid ejecting head in the first aspect, and a liquid reservoir configured to store liquid to be supplied to the liquid ejecting head.

DESCRIPTION OF EMBODIMENTS

A. Embodiment

Figure 2:
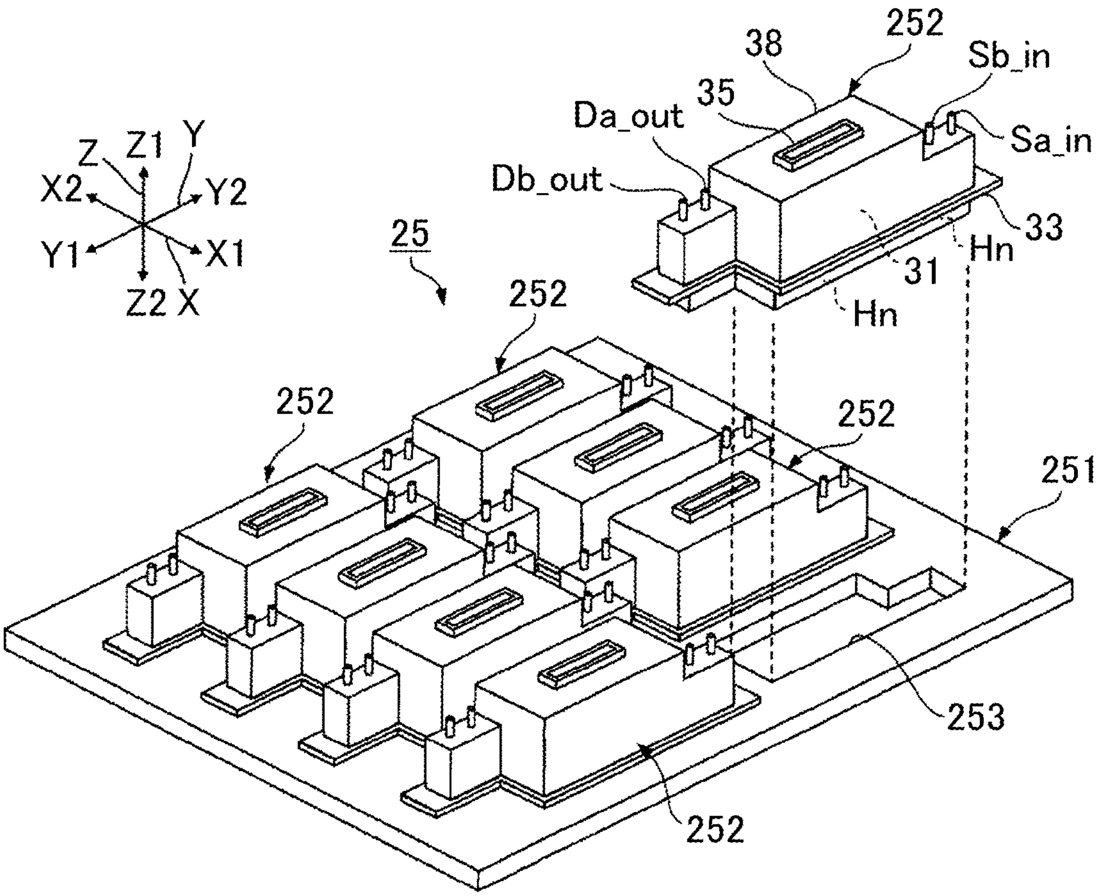
FIG. 2 is a perspective view of a head module.

In the following description, X-axis, Y-axis and Z-axis perpendicular to each other are assumed. As exemplified in FIG. 2, one direction as seen from any point along the X-axis is denoted as X1 direction, and the direction opposite to the X1 direction is denoted as X2 direction. Similarly, opposite directions to each other as seen from any point along the Y-axis are denoted as Y1 direction and Y2 direction, and opposite directions to each other as seen from any point along the Z-axis are denoted as Z1 direction and Z2 direction. The X-Y plane including the X-axis and the Y-axis corresponds to a horizontal plane. The Z-axis is an axial line along the vertical direction, and the Z2 direction corresponds the downward vertical direction. Note that X-axis, Y-axis, Z-axis should cross at an angle of approximately 90 degrees. In the accompanying drawings, the dimensions and scale of each component are different from actual ones as appropriate, and some of the drawings are schematically illustrated to facilitate the understanding. In addition, as needed, X-axis, Y-axis, Z-axis corresponding to FIG. 2 are also illustrated in other figures.

Figure 1:
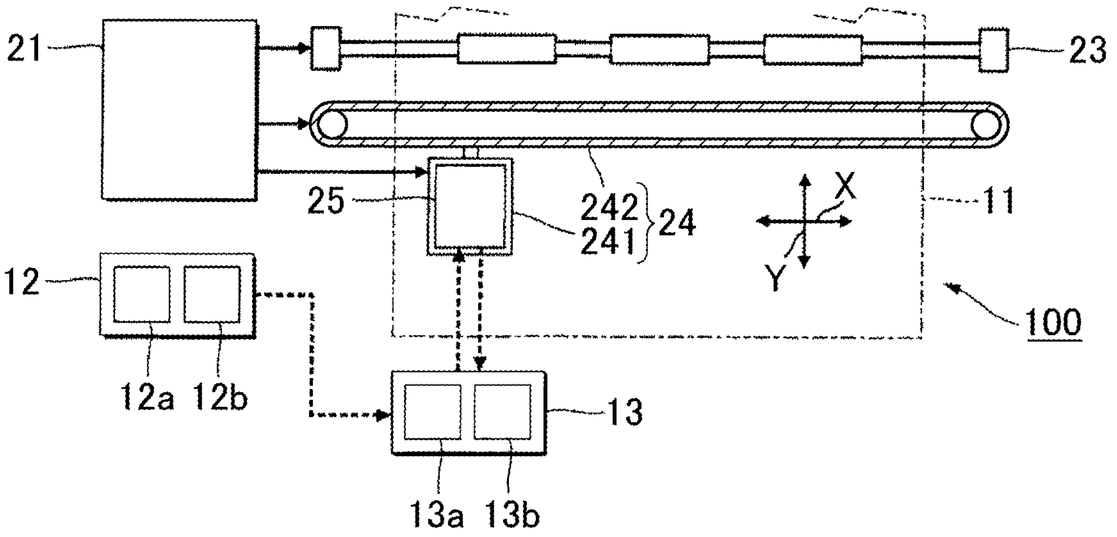
FIG. 1 is a configuration diagram of a liquid ejecting apparatus in an embodiment.

FIG. 1 is a configuration diagram of a liquid ejecting apparatus 100 in an embodiment. The liquid ejecting apparatus 100 is an ink jet printing apparatus that ejects ink to a medium 11 as a droplet, the ink being an example of liquid. The medium 11 is typically printing paper. However, a printing target made of any material such as a resin film or a fabric is utilized as the medium 11. For example, as the ink, solvent ink and ultraviolet curing ink may be mentioned. Solvent ink contains an organic solvent, and after the solvent ink is applied to the medium 11, the organic solvent enters the medium 11 to form a receptive layer, and a color material is fixed onto the receptive layer. The ultraviolet curing ink contains an ultraviolet curing component, and after the ultraviolet curing ink is applied to the medium 11, irradiation of the medium 11 with ultraviolet rays causes the ultraviolet curing component to be cured, and a color material is fixed in a film formed by the irradiation.

As exemplified in FIG. 1, a liquid container 12 as a liquid reservoir to store ink is installed in the liquid ejecting apparatus 100. The liquid container 12 stores the ink to be supplied to the later-described liquid ejecting head 252. For example, a detachable cartridge to the liquid ejecting apparatus 100, a bag-shaped ink pack formed of a flexible film, or a refillable ink tank is utilized as the liquid container 12. The liquid container 12 includes a first liquid container 12*a* and a second liquid container 12*b*. A first ink is stored in the first liquid container 12*a*, and a second ink is stored in the second liquid container 12*b*. The first ink and the second ink are different types of ink. As examples of the first ink and the second ink, the first ink may be cyan ink, and the second ink may be magenta ink.

The liquid ejecting apparatus 100 is provided with a sub-tank 13 that temporarily stores ink. The ink supplied from the liquid container 12 is stored in the sub-tank 13. The sub-tank 13 includes a first sub-tank 13*a* in which the first ink is stored, and a second sub-tank 13*b* in which the second ink is stored. The first sub-tank 13*a* is connected to the first liquid container 12*a*, and the second sub-tank 13*b* is connected to the second liquid container 12*b*. The sub-tank 13 is connected to a head module 25 to supply ink thereto, and collect ink therefrom.

The liquid ejecting apparatus 100 includes a control unit 21, a transport mechanism 23, a moving mechanism 24, and a head module 25. The control unit 21 is a controller that controls each element of the liquid ejecting apparatus 100. The control unit 21 includes e.g., one or more processing circuits such as a central processing unit (CPU) or a field programmable gate array (FPGA), and one or more storage circuits such as a semiconductor memory.

The transport mechanism 23 transports the medium 11 along the Y-axis under the control of the control unit 21. The moving mechanism 24 reciprocates the head module 25 along the X-axis under the control of the control unit 21. The moving mechanism 24 in the present embodiment includes a substantially box-shaped transport body 241 that houses the head module 25, and an endless belt 242 to which the transport body 241 is fixed. Note that a configuration may be adopted in which the liquid container 12 and the sub-tank 13 are mounted on the transport body 241 along with the head module 25.

The head module 25 ejects the ink supplied from the sub-tank 13 to the medium 11 through each of a plurality of nozzles N under the control of the control unit 21. Concurrently with transport of the medium 11 and repeated reciprocation of the transport body 241 by the transport mechanism 23, the head module 25 ejects ink to the medium 11, thereby forming an image on the surface of the medium 11. The ink not ejected through the plurality of nozzles is output to the sub-tank 13.

In the present embodiment, the sub-tank 13 constitutes part of an external flow path (not illustrated) installed outside the head module 25. The external flow path includes a flow path to connect the head module 25 and the sub-tank 13, and a circulation pump for delivering ink from the head module 25 to the sub-tank 13.

FIG. 2 is a perspective view of the head module 25. The head module 25 includes a support 251, and a plurality of liquid ejecting heads 252. The support 251 is a plate-shaped member that supports the plurality of liquid ejecting heads 252. A plurality of mounting holes 253 are formed in the support 251. Each of the plurality of liquid ejecting heads 252 is supported by the support 251 with inserted in a corresponding one of the mounting holes 253. The plurality of liquid ejecting heads 252 are arranged in a matrix form along the X-axis and the Y-axis. However, the number of liquid ejecting heads 252, and the arrangement form of the plurality of liquid ejecting heads 252 are not limited to the above examples.

Figure 3:
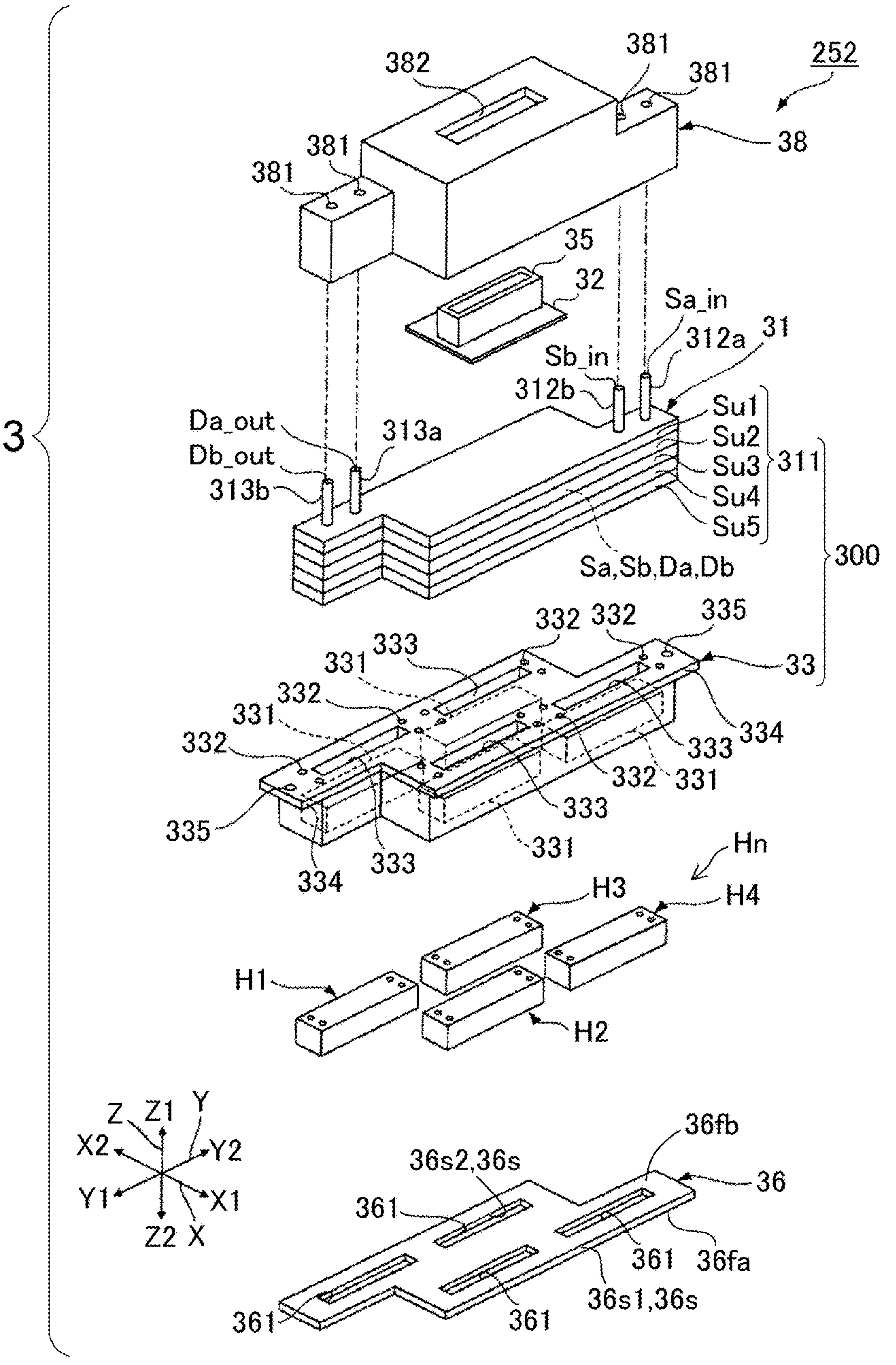
FIG. 3 is an exploded perspective view of a liquid ejecting head.

FIG. 3 is an exploded perspective view of the liquid ejecting head 252. The liquid ejecting head 252 includes a flow path structure 300, a wiring substrate 32, a plurality of head chips Hn, a fixing plate 36, and a cover 38. The flow path structure 300 includes a flow path member 31, and a holder 33.

The flow path member 31 is a member in which a liquid flow path for flowing ink is formed. The flow path member 31 includes a base body 311, a first supply projection 312*a*, a second supply projection 312*b*, a first discharge projection 313*a*, and a second discharge projection 313*b*.

The base body 311 is formed by stacking a substrate Su1, a substrate Su2, a substrate Su3, a substrate Su4, and a substrate Su5. The substrate Su1 is located in the uppermost layer in a vertical direction, and the substrate Su5 is located in the lowermost layer in a vertical direction. The plurality of substrates Su1, Su2, Su3, Su4 and Su5 are formed, for example, by injection molding of a resin material. Hereinafter, when the substrates Su1, Su2, Su3, Su4 and Su5 are not distinguished, they are denoted as the substrate Su. The substrates Su1, Su2, Su3, Su4, Su5 adjacent to each other are bonded by an adhesive. As the adhesive, the same material as the later-described first adhesive may be used.

Inside the base body 311, a first supply flow path Sa, a second supply flow path Sb, a first discharge flow path Da, and a second discharge flow path Db are provided as liquid flow paths. The first supply flow path Sa is for supplying the first ink stored in the first sub-tank 13*a* illustrated in FIG. 1 to the plurality of head chips Hn. The second supply flow path Sb is for supplying the second ink stored in the second sub-tank 13*b* illustrated in FIG. 1 to the plurality of head chips Hn. The first discharge flow path Da is for discharging the first ink not discharged through the plurality of head chips Hn to the first sub-tank 13*a*. The second discharge flow path Db is for discharging the second ink not discharged through the plurality of head chips Hn to the second sub-tank 13*b*. The first supply flow path Sa, the second supply flow path Sb, the first discharge flow path Da, and the second discharge flow path Db are each a space formed in the base body 311. The space is formed by one or both of the grooves along the X-Y plane, provided in two substrates Su adjacent to each other.

As exemplified in FIG. 3, the first supply projection 312*a*, the second supply projection 312*b*, the first discharge projection 313*a*, and the second discharge projection 313*b* each project from the base body 311 in the Z1 direction. The first supply projection 312*a* is a supply pipe provided with a first supply port Sa_in for supplying the first ink from the first sub-tank 13*a* to the first supply flow path Sa. The second supply projection 312*b* is a supply pipe provided with a second supply port Sb_in for supplying the second ink from the second sub-tank 13*b* to the second supply flow path Sb. The first discharge projection 313*a* is a discharge pipe provided with a first discharge port Da_out for discharging the first ink from the first discharge flow path Da to the first sub-tank 13*a*. The second discharge projection 313*b* is a discharge pipe provided with a second discharge port Db out for discharging the second ink from the second sub-tank 13*b* to the second discharge flow path Db.

The holder 33 is a member that houses a plurality of head chips H1, H2, H3 and H4, and holds the head chips between itself and the fixing plate 36. Hereinafter, when the head chips H1, H2, H3 and H4 are not distinguished, they are denoted as the head chip Hn. The holder 33 is made of e.g., a metal material such as a stainless steel. The holder 33 may be made of a material such as a carbon steel, aluminum, and a thermosetting resin. In addition, a plating process may be applied to the surface of the holder 33 with nickel or the like. The holder 33 is provided with a plurality of recessed portions 331, a plurality of ink holes 332, and a plurality of wiring holes 333. The head chip Hn is disposed in each recessed portion 331. Each ink hole 332 is a flow path for flowing ink between the flow path member 31 and the head chip Hn. Each wiring hole 333 is a hole for passing a wire (not illustrated) that connects the head chip Hn and the wiring substrate 32. In addition, the holder 33 has a flange 334 to fix the holder 33 to the support 251 exemplified in FIG. 2. The flange 334 is a fixing member provided with a plurality of screw holes 335 for clamping to the support 251.

Each head chip Hn ejects the ink supplied from the flow path member 31 in an ejection direction. The ejection direction is a downward direction along the vertical direction, that is, the Z2 direction. Although illustration is omitted in FIG. 3, each head chip has a nozzle plate 41 which has a plurality of nozzles N for ejecting ink. In each head chip Hn, the plurality of nozzles N have a plurality of nozzles N for ejecting the first ink, and a plurality of nozzles N for ejecting the second ink.

The wiring substrate 32 is a mounting component for electrically connecting the liquid ejecting head 252 to the control unit 21 exemplified in FIG. 1. The wiring substrate 32 is disposed on the flow path member 31. A connector 35 is installed in the wiring substrate 32. The connector 35 is a connection component to electrically connect the liquid ejecting head 252 and the control unit 21. Although not illustrated, the wiring substrate 32 is connected to a wire to be connected to the plurality of head chips Hn. Note that the wire may be formed integrally with the wiring substrate 32.

As illustrated in FIG. 3, the fixing plate 36 is a plate member for fixing the plurality of head chips Hn to the holder 33 of the flow path structure 300. The fixing plate 36 is disposed with the plurality of head chips Hn interposed between itself and the holder 33. The fixing plate 36 is a plate material made of e.g., a metal material such as a stainless steel. The fixing plate 36 includes a first surface 36*fa* facing in the ejection direction, a second surface 36*fb* on the opposite side of the first surface 36*fa*, and a lateral surface 36*s* that connects the first surface 36*fa* and the second surface 36*fb*. The fixing plate 36 further has a plurality of exposure openings 361 for exposing the nozzle plate 41 included in the head chip Hn to the outside. The exposure openings 361 penetrate the fixing plate 36 in a direction along the ejection direction. The exposure openings 361 are individually provided for respective head chips Hn. The lateral surface 36*s* of the fixing plate 36 includes an outer peripheral surface 36*s*1 that defines the outer periphery of the fixing plate 36, and an inner peripheral surface 36*s*2 that defines the exposure openings 361.

The cover 38 is a box-shaped member that houses the base body 311 of the flow path member 31 and the wiring substrate 32. The cover 38 is made of e.g., a resin material. The cover 38 is provided with four projection holes 381 and an opening 382. The first supply projection 312*a*, the second supply projection 312*b*, the first discharge projection 313*a*, or the second discharge projection 313*b* is inserted into a corresponding one the projection holes 381. The connector 35 is inserted into the opening 382. Note that a through-hole may be provided in the lateral surface of the cover 38. At the time of ink ejection, a gas containing ink components may enter the cover 38. Due to the through-hole provided, even when a gas containing ink components enters the cover 38, the gas containing ink components can be released to the outside via the through-hole. The through-hole may be linked to a tubular member and a pump. In this situation, driving the pump can forcibly release the gas containing ink components in the cover 38 to the outside through the tubular member.

Figure 4:
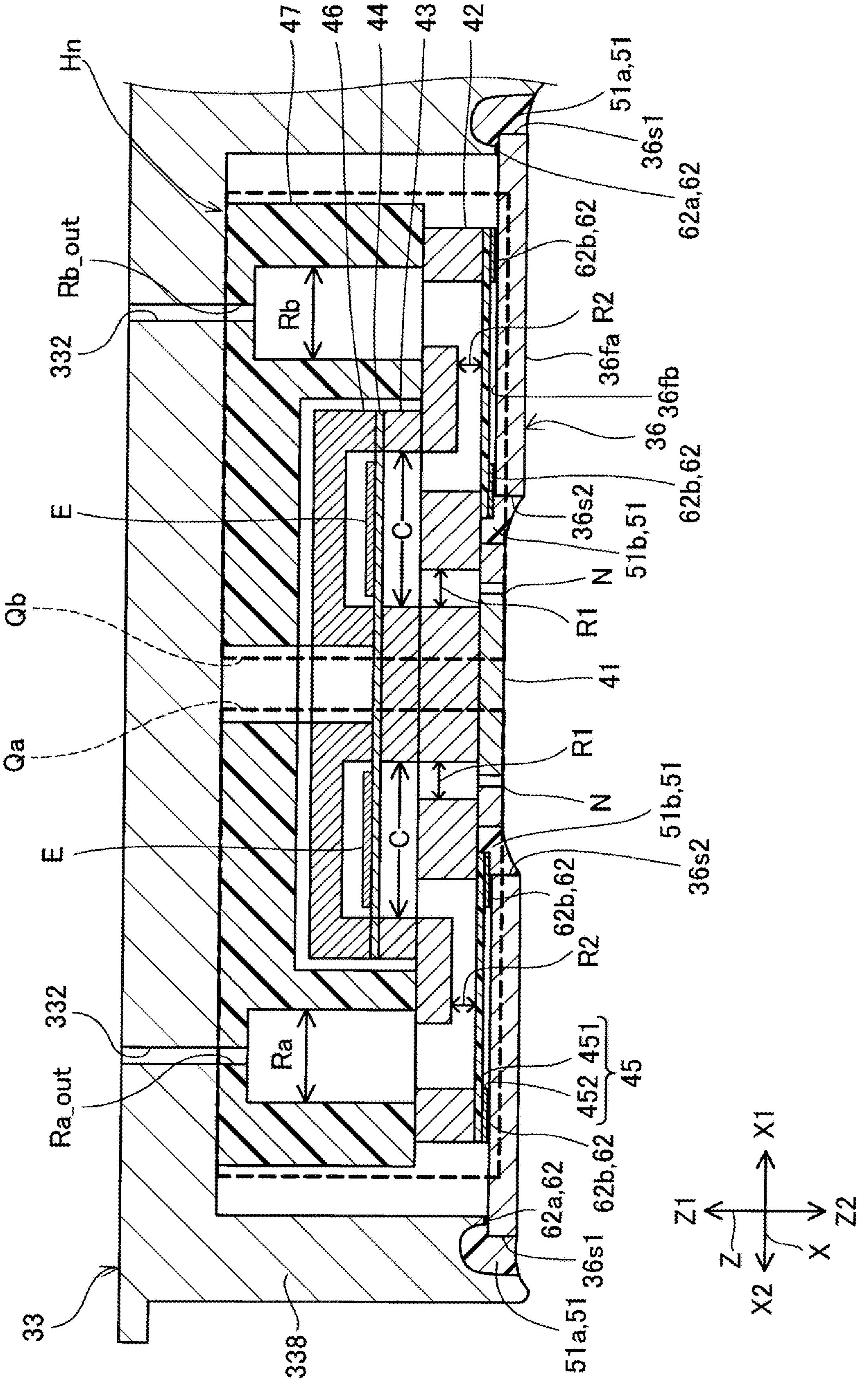
FIG. 4 is a sectional view exemplifying the configuration of a holder, a head chip, and a fixing plate.

FIG. 4 is a sectional view exemplifying the configuration of the holder 33, the head chip Hn, and the fixing plate 36. The head chip Hn includes the nozzle plate 41, a communication plate 42, a pressure chamber substrate 43, a vibration plate 44, a plurality of driving elements E, a protection section 46, a housing section 47, and a compliance substrate 45.

The head chip Hn includes a first liquid ejector Qa and a second liquid ejector Qb. The first liquid ejector Qa ejects the first ink supplied from the first sub-tank 13*a* through corresponding plurality of nozzles N. The second liquid ejector Qb ejects the second ink supplied from the second sub-tank 13*b* through other corresponding plurality of nozzles N. The first liquid ejector Qa has a first liquid storage chamber Ra that is a liquid chamber continuously common between the plurality of nozzles N corresponding to the first ink. The second liquid ejector Qb has a second liquid storage chamber Rb that is a liquid chamber continuously common between the plurality of nozzles N corresponding to the second ink. The first liquid ejector Qa and the second liquid ejector Qb each include a plurality of pressure chambers C and a plurality of driving elements E. A pressure chamber C and a driving elements E are formed for each nozzle N. Each head chip Hn is provided with supply holes Ra_in, Rb_in (not illustrated) to which ink is supplied, and discharge holes Ra_out, Rb_out (not illustrated) through which ink is discharged. The supply hole Ra_in and the discharge hole Ra_out communicate with the first liquid storage chamber Ra. The supply hole Rb_in and the discharge hole Rb_out communicate with the second liquid storage chamber Rb.

The nozzle plate 41, the communication plate 42, the pressure chamber substrate 43, the vibration plate 44, the housing section 47, and the compliance substrate 45 are each a long plate-shaped member along the Y-axis. The pressure chamber substrate 43 and the housing section 47 are installed in the communication plate 42 in the Z1 direction. In contrast, the nozzle plate 41 and the compliance substrate 45 are installed in the communication plate 42 in the Z2 direction. The elements included in the first liquid ejector Qa and the elements included in the second liquid ejector Qb have a structure disposed in substantially plane symmetry. Thus, in the following description, the elements corresponding to the first liquid ejector Qa will be focused and described, and a description of the elements corresponding to the second liquid ejector Qb will be omitted as needed.

The nozzle plate 41 is a plate-shaped member having a plurality of nozzles N. Each nozzle N is a through-hole for ejecting ink. The nozzle plate 41 is manufactured by processing a single-crystal silicon substrate by utilizing e.g., a semiconductor manufacturing technique such as photolithography and etching. However, for manufacture of the nozzle plate 41, publicly known materials and manufacturing methods may be arbitrarily adopted. Ink is supplied to the nozzle N from the liquid flow path of the flow path member 31 through the first liquid storage chamber Ra. In the present embodiment, a water repellent film is formed on at least the surface of the nozzle plate 41, facing in the ejection direction, thus the surface of the nozzle plate 41 has water repellency.

The communication plate 42 is provided with a communication flow path R1 and a supply flow path R2. The communication flow path R1 is provided for each nozzle N, and communicates with the nozzle N. The supply flow path R2 communicates with the nozzle N and the first liquid storage chamber Ra, and supplies ink from the first liquid storage chamber Ra to the nozzle N. The pressure chamber substrate 43 is provided with a plurality of pressure chambers C. Each pressure chamber C is a space that communicates with the nozzle N through the communication flow path R1. The pressure chamber C communicates with the first liquid storage chamber Ra through the supply flow path R2. The communication plate 42 and the pressure chamber substrate 43 are manufactured by processing a single-crystal silicon substrate by utilizing e.g., a semiconductor manufacturing technique. Note that for manufacture of the communication plate 42 and the pressure chamber substrate 43, publicly known materials and manufacturing methods may be arbitrarily adopted.

The vibration plate 44 which is elastically deformable is disposed at an upper portion of the pressure chamber C. The vibration plate 44 is stacked on the pressure chamber substrate 43, and is in contact with the surface of the pressure chamber substrate 43, the surface being opposite to the communication plate 42. Part or all of the vibration plate 44 may be a separate member from or may be integrated with the pressure chamber substrate 43. For each pressure chamber C, a driving element E is formed on a surface of the vibration plate 44, the surface being on the opposite side of the pressure chamber C. The driving element E causes the pressure of the ink in the pressure chamber C to vary. The driving element E is a piezoelectric element that changes the volume of the pressure chamber C, for example, by deforming the wall surface thereof. The driving element E may be a heating element that creates air bubbles in the pressure chamber C by heating the ink in the pressure chamber C. The driving element E causes the pressure of the ink in the pressure chamber C to vary, thereby ejecting the ink in the pressure chamber C through the nozzle N.

The protection section 46 is disposed on the vibration plate 44. The protection section 46 protects the plurality of drive elements E as well as reinforces the mechanical strength of the pressure chamber substrate 43 and the vibration plate 44. The protection section 46 is manufactured by processing a single-crystal silicon substrate by utilizing e.g., a semiconductor manufacturing technique. A wiring substrate (not illustrated) is joined to the surface of the vibration plate 44. On the wiring substrate, a plurality of wires for electrically connecting the control unit 21 and the liquid ejecting head 252 are formed.

The housing section 47 is a case for reserving the ink to be supplied to the plurality of pressure chambers C, and is formed, for example, by injection molding of a resin material. In the housing section 47, the first liquid storage chamber Ra and the second liquid storage chamber Rb are formed. The first liquid storage chamber Ra and the second liquid storage chamber Rb each communicate with the liquid flow path of the flow path member 31 through the ink holes 332 of the holder 33.

The compliance substrate 45 constitutes part of the wall surface of the supply flow path R2. The compliance substrate 45 has a sealing film 451 and a support plate 452. The sealing film 451 is a film having flexibility, and is in contact with the communication plate 42. The sealing film 451 is made of e.g., a resin material such as polyphenylene sulfide or aromatic polyamide. The support plate 452 is provided on a surface of the sealing film 451, the surface being opposite to the communication plate 42. The support plate 452 is made of e.g., metal such as a stainless steel. The support plate 452 has an opening through in the thickness direction. Thus, the portion, not provided with the support plate 452, of the compliance substrate 45 is formed of only the sealing film 451. The portion has a buffering function of absorbing pressure fluctuation of the ink in the first liquid storage chamber Ra and the second liquid storage chamber Rb. In other words, the portion functions as a buffering section.

The holder 33 and the fixing plate 36 are bonded by a first adhesive 62*a*. The compliance substrate 45 of the head chip Hn and the fixing plate 36 are bonded by a second adhesive 62*b*. The first adhesive 62*a* and the second adhesive 62*b* are made of the same material, thus when used without being distinguished, the term, adhesive 62 is used. The adhesive 62 is made of an organic adhesive. In the present embodiment, the adhesive 62 is a silicone-based adhesive that is cured at room temperature. The silicone-based adhesive is advantageous in that it is easily handled and has superior heat resistance. The silicone-based adhesive may be moisture-curable. Since the adhesive 62 is moisture-curable, its handling is particularly easy, thus efficient bonding between the nozzle plate 41 and the holder 33 as well as between the nozzle plate 41 and the compliance substrate 45 can be achieved. However, an epoxy-based adhesive may be used as the adhesive 62. As the adhesive 62, e.g., an adhesive containing a bisphenol type A epoxy resin may be used. Alternatively, as the adhesive 62, an adhesive containing calcium carbonate or polyoxyalkylene glycidyl ether as the main component may be used.

A mold 51 is disposed between the holder 33 and the fixing plate 36, and between the nozzle plate 41 and the fixing plate 36. The mold 51 is made of a thermosetting resin or a light curing resin. The mold 51 may be made of, for example, an epoxy resin. The mold 51 with excellent filling property is likely to be formed using an epoxy-based adhesive. The mold 51 includes a first mold 51*a* disposed between the outer peripheral surface 36*s*1 of the fixing plate 36 and the holder 33, and a second mold 51*b* disposed between the inner peripheral surface 36*s*2 and the nozzle plate 41 of the head chip Hn. Specifically, in a direction perpendicular to the Z direction along the ejection direction, for example, in the X direction or the Y direction, at least part of the first mold 51*a* is located between the outer peripheral surface 36*s*1 and the holder 33. Also, in a direction perpendicular to the Z direction along the ejection direction, at least part of the second mold 51*b* is disposed between the inner peripheral surface 36*s*2 and the nozzle plate 41.

Liquid resistance A1 of the mold 51 including the first mold 51*a* and the second mold 51*b* is higher than liquid resistance B1 of the adhesive 62. Reactivity between liquid ink, and the adhesive 62 or the mold 51 allows the solubility parameter between the ink and the adhesive 62 to be numerically compared with the solubility parameter between the ink and the mold 51. Specifically, the liquid resistance A1 is higher than the liquid resistance B1, which indicates that the following relationship holds: $|SPb-SPz|>|SPa-SPz|$, where SPa is the solubility parameter of the adhesive 62, SPb is the solubility parameter of the mold 51, and SPz is the solubility parameter of the ink. The relationship of $|SPb-SPz|>|SPa-SPz|$ holds, which indicates that the reactivity between the ink and the mold 51 is less than the reactivity between the ink and the adhesive 62, in other words, the mold 51 has higher liquid resistance than the adhesive 62.

In general, in the liquid ejecting head 252, when the bond strength between two members is not high, in other words, when the adhesiveness between two members is low, a gap may occur in the bond interface, and the possibility of intrusion of ink as liquid to the inside from the outside through the gap increases. For example, when the adhesiveness between the mold 51 and the nozzle plate 41 is low, ink may enter through the bond interface between the mold 51 and the nozzle plate 41. When ink enters the inside, the ink may reach the first adhesive 62*a* or the second adhesive 62*b*. In the present embodiment, the first adhesive 62*a* and the second adhesive 62*b* are room temperature-curable silicone-based adhesive having low liquid resistance. Thus, the possibility of breakage of the layer of the first adhesive 62*a* or the second adhesive 62*b* due to the ink reached is increased.

In a process forming a water repellent film on a surface including the first surface 36*fa* or the second surface 36*fb* of the fixing plate 36, a water repellent film may be formed on the outer peripheral surface 36*s*1 or the inner peripheral surface 36*s*2. In such a case, due to reduction in the bond strength between the first mold 51*a* and the outer peripheral surface 36*s*1 and the bond strength between the second mold 51*b* and the inner peripheral surface 36*s*2, the bond strength between the mold 51 and the nozzle plate 41 is further reduced, thus the above-mentioned problem of entering of ink from the outside to the inside is likely to occur often.

In addition, when a mechanical stress is applied to the fixing plate 36, the mold 51 may be peeled off from the lateral surface 36*s* at the bond interface between the lateral surface 36*s* of the fixing plate 36 and the mold 51. When the mold 51 is peeled off from the lateral surface 36*s*, ink may enter the inside of the liquid ejecting head 252 through a portion where the mold 51 is peeled off. In addition, it is difficult to stably bond the mold 51 to the entire lateral surface 36*s* of the fixing plate 36, thus the mold 51 may be bonded to only part of the lateral surface 36*s*. When the mold 51 is bonded to only part of the lateral surface 36*s*, the bond strength between the mold 51 and the fixing plate 36 is likely to reduce.

Figure 5:
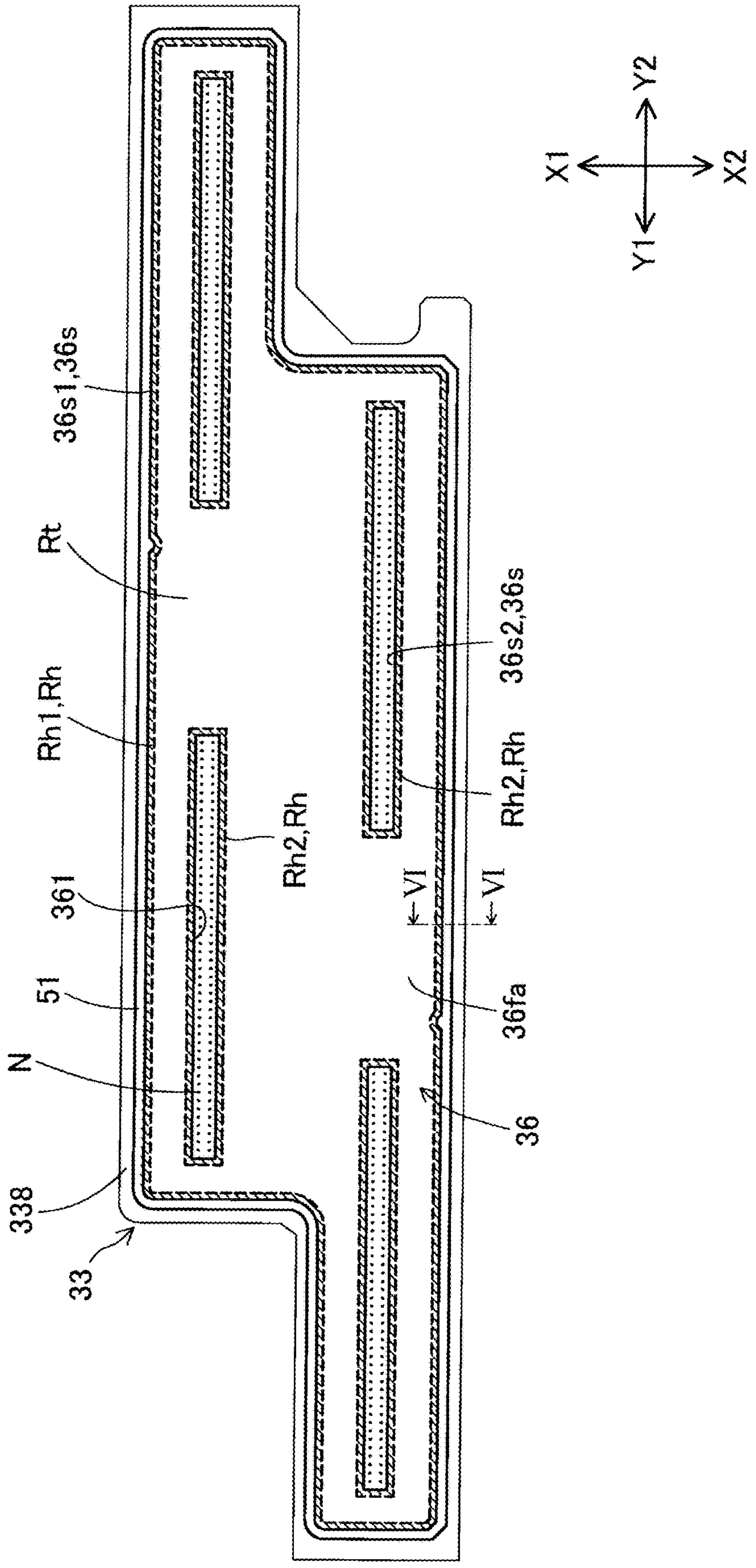
FIG. 5 is a plan view of a head unit as seen toward a first surface.
Figure 6:
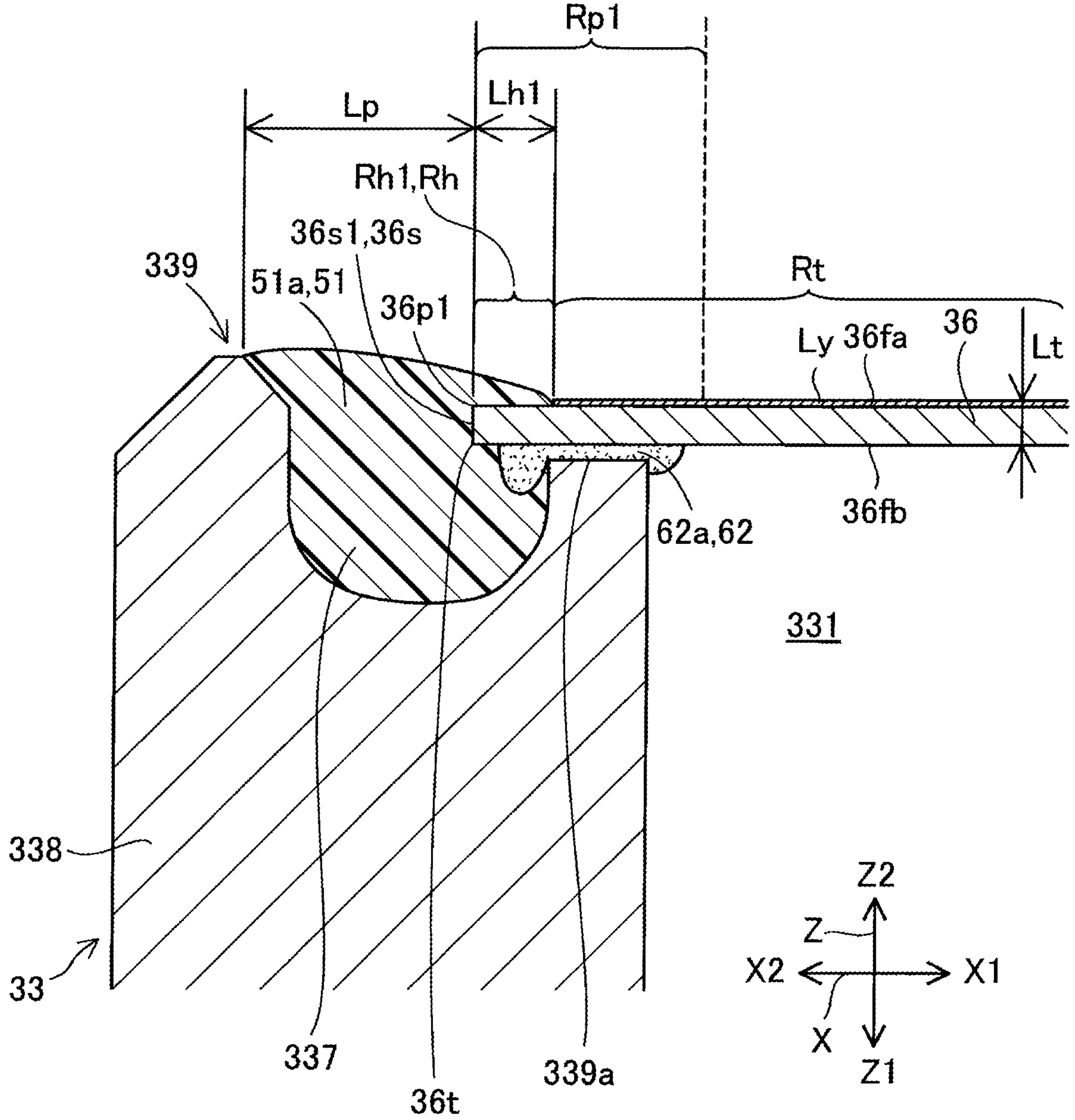
FIG. 6 is a partial sectional view taken along VI-VI of FIG. 5.

FIG. 5 is a plan view of the liquid ejecting head 252 as seen toward the first surface 36*fa*. FIG. 6 is a partial sectional view taken along VI-VI of FIG. 5. In FIG. 6, in order to facilitate the understanding, the components disposed in the recessed portion 331 are not illustrated.

As illustrated in FIG. 5, in a plan view, the first surface 36*fa* of the fixing plate 36 includes a water repellent region Rt having water repellency, and a hydrophilic region Rh having lower water repellency than the water repellent region Rt. The water repellent region Rt is a region in which a water repellent film is formed on the first surface 36*fa* of the fixing plate 36. The water repellent film includes e.g., a functional group having fluorine. As with the water repellent region Rt, the lateral surface 36*s* also has water repellency by forming a water repellent region therein. In a plan view, the hydrophilic region Rh is disposed between the water repellent region Rt and the lateral surface 36*s*. In order to facilitate the understanding, on the first surface 36*fa*, single hatching is applied to the hydrophilic region Rh, and hatching is not applied to the repellent region Rt.

The hydrophilic region Rh includes a first region Rh1 disposed along the outer peripheral surface 36*s*1 of the fixing plate 36, and a second region Rh2 disposed along the inner peripheral surface 36*s*2 of the fixing plate 36. The first region Rh1 is disposed on the entire outer peripheral edge of the first surface 36*fa*. The second region Rh2 is disposed on the entire peripheral edge of the exposure openings 361.

The hydrophilic region Rh is formed by removing part of a water repellent film in a region to become the hydrophilic region Rh by irradiating the region with a laser, the water repellent film being formed on the entire surface of the first surface 36*fa* by dip coating. Note that the second surface 36*fb* of the fixing plate 36 illustrated in FIG. 3 is formed by a hydrophilic region which has lower water repellency than the water repellent region Rt. As with the hydrophilic region Rh of the first surface 36*fa*, the hydrophilic region of the second surface 36*fb* is formed by removing part of a water repellent film by irradiating the part with a laser, the water repellent film being formed on the entire surface of the second surface 36*fb* by dip coating.

In the present embodiment, "having water repellency" indicates that the static contact angle with respect to pure water is greater than or equal to 90 degrees. In the hydrophilic region Rh, the static contact angle with respect to pure water may be less than 90 degrees, less than 45 degrees, or less than 30 degrees.

As illustrated in FIG. 6, the holder 33 has an outer peripheral wall 338 that defines the recessed portion 331 that houses the head chip Hn. The outer peripheral wall 338 is a sidewall that extends from the bottom of the recessed portion 331 in the ejection direction. The outer peripheral wall 338 has a bottom surface 339 that forms the end of the outer peripheral wall 338 in the ejection direction. The bottom surface 339 faces in the Z2 direction that is the ejection direction. The bottom surface 339 has a groove 337 that is recessed in the direction opposite to the ejection direction. Of the bottom surface 339, the inner side of the groove 337, that is, an inner bottom surface 339*a* located between the groove 337 and the recessed portion 331 is a plane facing in the Z2 direction. The inner bottom surface 339*a* of the bottom surface 339 is fixed to the second surface 36*fb* by the adhesive 62. In other words, the outer peripheral wall 338 is fixed to the second surface 36*fb* by the adhesive 62 on the inner bottom surface 339*a*. In a plan view as seen toward the first surface 36*fa*, the groove 337 is formed at a position overlapping with the outer peripheral surface 36*s*1 of the fixing plate 36. In other words, in a direction along the plane of the fixing plate 36, the outer peripheral surface 36*s*1 of the fixing plate 36 projects outward of the inner bottom surface 339*a*. The adhesive 62 in the present embodiment is located in the adhesive region interposed between the inner bottom surface 339*a* and the second surface 36*fb*, and in a region protruding outward from the adhesive region. In the present embodiment, the adhesive 62 is not applied to an edge 36*t* of the second surface 36*fb*, where the second surface 36*fb* and the lateral surface 36*s* intersect, and a region up to a certain distance from the edge 36*t*.

The first region Rh1 of the first surface 36*fa* is bonded to part of the first mold 51*a* disposed between the outer peripheral surface 36*s*1 of the lateral surface 36*s* and the holder 33. Specifically, the first mold 51*a* is filled in the groove 337 so as to cover the first region Rh1. Thus, the first mold 51*a* covers the first adhesive 62*a* disposed to protrude into the groove 337. As described above, part of the first mold 51*a* is disposed inside the groove 337. Since part of the first mold 51*a* is disposed inside the groove 337, the contact area between the holder 33 and the first mold 51*a* can be increased, therefore, the bond strength between the holder 33 and the first mold 51*a* can be improved.

As mentioned above, the water repellent region Rt is a region where a water repellent film Ly is formed. Although illustration is omitted, the lateral surface 36*s* also has water repellency by forming a water repellent film on the lateral surface 36*s*. In the present embodiment, the first region Rh1 of the first surface 36*fa* is formed between the water repellent region Rt and the outer peripheral surface 36*s*1 so as to be adjacent to the outer peripheral surface 36*s*1 as the lateral surface 36*s*. Specifically, the first region Rh1 extends to the end of the water repellent region Rt from a first edge 36*p*1 where the outer peripheral surface 36*s*1 and the first surface 36*fa* intersect. Similarly, as illustrated in FIG. 5, the second region Rh2 of the first surface 36*fa* is formed between the water repellent region Rt and the inner peripheral surface 36*s*2 so as to be adjacent to the inner peripheral surface 36*s*2 as the lateral surface 36*s*. Specifically, the second region Rh2 extends to the outer peripheral portion of the water repellent region Rt from a second edge 36*p*2 where the inner peripheral surface 36*s*2 and the first surface 36*fa* intersect.

As illustrated in FIG. 6, part of the first mold 51*a* is bonded to the second surface 36*fb*. Specifically, part of the first mold 51*a* is bonded to a region of the second surface 36*fb*, the region being adjacent to the edge 36*t*. As seen in the ejection direction, part of the first mold 51*a* on the hydrophilic region Rh overlaps with part of the first mold 51*a* on the second surface 36*fb*. In other words, the first mold 51*a* is present on both sides of the fixing plate 36. Since the first mold 51*a* is present across both the first surface 36*fa* and the second surface 36*fb*, the bond strength between the fixing plate 36 and the first mold 51*a* can be further improved.

In a plan view of the liquid ejecting head 252 as seen toward the first surface 36*fa*, dimension Lh1 of the first region Rh1 is greater than thickness Lt of the fixing plate 36 in the arrangement direction (corresponding to the X direction in FIG. 6) of the outer peripheral surface 36*s*1 and the first region Rh1 which are adjacent to each other. Note that the thickness Lt of the fixing plate 36 is a largest thickness, and is the thickness of a portion where the water repellent film Ly is formed in the present embodiment. Thus, the area of the first region Rh1 to which the first mold 51*a* is bonded can be increased, therefore, the bond strength between the first mold 51*a* and the first region Rh1 can be improved. Thus, it is possible to further inhibit intrusion of the ink adhering to the first mold 51*a* from the outside to the inside of the liquid ejecting head 252 through the bond interface between the first mold 51*a* and the outer peripheral surface 36*s*1. Note that the dimension Lh1 may be greater than twice the thickness Lt. In this manner, the area of the first region Rh1 to which the first mold 51*a* is bonded can be further increased, therefore, the bond strength between the first mold 51*a* and the first region Rh1 can be further improved. Thus, it is possible to further inhibit intrusion of ink from the outside to the inside of the liquid ejecting head 252.

In a plan view of the liquid ejecting head 252 as seen toward the first surface 36*fa*, the dimension Lh1 of the first region Rh1 has a relationship that the dimension Lh1 is smaller than dimension Lp of the portion of the first mold 51*a*, disposed between the outer peripheral surface 36*s*1 and the holder 33 in the arrangement direction (corresponding to the X direction in FIG. 6) of the outer peripheral surface 36*s*1 as the lateral surface 36*s* and the first region Rh1 which are adjacent to each other. When the portion of the first mold 51*a*, bonded to the fixing plate 36 is wide, the possibility of peeling off of part of the first mold 51*a* from the first region Rh1 may occur by a stress due to contraction of the first mold 51*a* at the time of curing thereof. Meanwhile, due to the above-mentioned relationship, the portion of the first mold 51*a*, bonded to the first region Rh1 can be less affected by a stress due to contraction of the first mold 51*a* at the time of curing, thus the possibility of peeling off of part of the first mold 51*a* from the first region Rh1 can be reduced. In addition, due to the above-mentioned relationship, the area of the first mold 51*a* bonded to the first surface 36*fa* can be reduced, thus, to prevent drying of the ink in the nozzle N, it is possible to sufficiently ensure the sealing area where a capping member covering the nozzle N comes into contact with the first surface 36*fa*.

The first region Rh1 may be formed in region Rp1 that is between the first edge 36*p*1 of the fixing plate 36, and the position located inwardly from the first edge 36*p*1 by the dimension Lp. Thus, the amount of the first mold 51*a* can be further reduced, therefore, the possibility of peeling off of part of the first mold 51*a* from the first region Rh1 can be further reduced. Consequently, it is possible to even sufficiently ensure the sealing area where the capping member for covering the nozzle N comes into contact with the first surface 36*fa*.

As described above, the fixing plate 36 and the holder 33 are fixed by the first adhesive 62 which is disposed between the second surface 36*fb* of the fixing plate 36 and the inner bottom surface 339*a* of the holder 33. Part of the first mold 51*a* is bonded to the second surface 36*fb*. Specifically, part of the first mold 51*a* is bonded to a portion of the second surface 36*fb*, the portion from the edge 36*t* to the location of the first adhesive 62*a*. In the present embodiment, the first mold 51*a* is disposed from the first surface 36*fa* to the second surface 36*fb* of the fixing plate 36, thus the bond strength between the fixing plate 36 and the first mold 51*a* can be further improved. In addition, the liquid resistance A1 of the first mold 51*a* is higher than the liquid resistance B1 of the adhesive 62, thus, it is possible to inhibit intrusion of liquid from the outside into the liquid ejecting head 252, and the adhesive 62 having a low liquid resistance can be protected.

Figure 7:
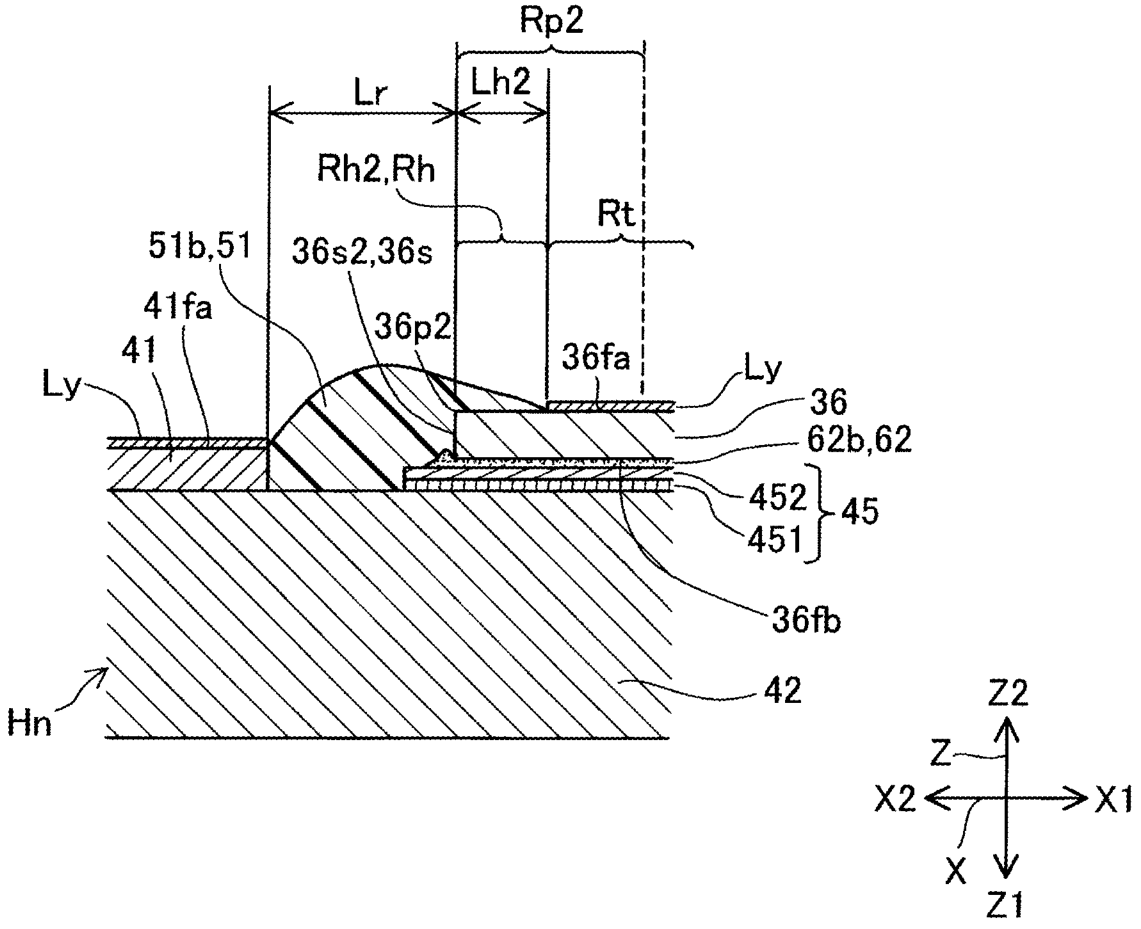
FIG. 7 is a schematic sectional view of a region including a second mold.

FIG. 7 is a schematic sectional view of a region including the second mold 51*b*. The second mold 51*b* is disposed between the inner peripheral surface 36*s*2 as the lateral surface 36*s* and the head chip Hn. More specifically, the second mold 51*b* is disposed to fill the gap between the inner peripheral surface 36*s*2 and the nozzle plate 41. Part of the second mold 51*b* is located on the second region Rh2, and bonded to the second region Rh2. Since the second region Rh2 has lower water repellency than the water repellent region Rt, the bond strength between the second region Rh2 and the second mold 51*b* can be improved. Thus, it is possible to inhibit intrusion of the ink adhering to the second mold 51*b* to the inside of the liquid ejecting head 252 through the bond interface between the second mold 51*b* and the inner peripheral surface 36*s*2.

In a plan view of the liquid ejecting head 252 as seen toward the first surface 36*fa*, dimension Lh2 of the second region Rh2 is greater than the thickness Lt of the fixing plate 36 illustrated in FIG. 6 in the arrangement direction (corresponding to the X direction in FIG. 7) of the inner peripheral surface 36*s*2 as the lateral surface 36*s* and the second region Rh2 which are adjacent to each other. Thus, the area of the second region Rh2 to which the second mold 51*b* is bonded can be increased, therefore, the bond strength between the second mold 51*b* and the second region Rh2 can be improved. Thus, it is possible to further inhibit intrusion of the ink adhering to the second mold 51*b* from the outside to the inside of the liquid ejecting head 252 through the bond interface between the second mold 51*b* and the inner peripheral surface 36*s*2. Note that the dimension Lh2 may be greater than twice the thickness Lt. In this manner, the area of the second region Rh2 to which the second mold 51*b* is bonded can be further increased, therefore, the bond strength between the second mold 51*b* and the second region Rh2 can be further improved. Thus, it is possible to further inhibit intrusion of ink from the outside to the inside of the liquid ejecting head 252.

In a plan view of the liquid ejecting head 252 as seen toward the first surface 36*fa*, the dimension Lh2 of the second region Rh2 has a relationship that the dimension Lh2 is smaller than dimension Lr of the portion of the second mold 51*b*, disposed between the inner peripheral surface 36*s*2 and the nozzle plate 41 in the arrangement direction (corresponding to the X direction in FIG. 7) of the inner peripheral surface 36*s*2 as the lateral surface 36*s* and the second region Rh2 which are adjacent to each other. When the portion of the second mold 51*b*, bonded to the fixing plate 36 is wide, the possibility of peeling off of part of the second mold 51*b* from the second region Rh2 may occur by a stress due to contraction of the second mold 51*b* at the time of curing thereof. Meanwhile, due to the above-mentioned relationship, the portion of the second mold 51*b*, bonded to the second region Rh2 can be less affected by a stress due to contraction of the second mold 51*b* at the time of curing, thus the possibility of peeling off of part of the second mold 51*b* from the second region Rh2 can be reduced.

The second region Rh2 may be formed in region Rp2 that is between the second edge 36*p*2 of the fixing plate 36, and the position away from the second edge 36*p*2 of the inner peripheral surface 36*s*2 by the dimension Lr. Thus, the amount of the second mold 51*b* can be further reduced, therefore, the possibility of peeling off of part of the mold 51 from the second region Rh2 can be further reduced.

According to the above embodiment, as illustrated in FIG. 6 and FIG. 7, part of the mold 51 is bonded to the hydrophilic region Rh of the first surface 36*fa*. Specifically, as illustrated in FIG. 6, part of the first mold 51*a* is bonded to the first region Rh1. As illustrated in FIG. 7, part of the second mold 51*b* is bonded to the second region Rh2. The hydrophilic region Rh has a high affinity with the mold 51, thus the bond strength between the hydrophilic region Rh and the mold 51 can be improved. Therefore, the bond strength between the fixing plate 36 and the mold 51 can be improved. Thus, the possibility of intrusion of ink to the inside through the gap between the first surface 36*fa* and the mold 51 can be reduced, therefore, it is possible to inhibit intrusion of ink from the outside to the bond interface between the lateral surface 36*s* and the mold 51. Thus, it is possible to inhibit the ink from reaching the adhesive 62, and therefore, the possibility of breakage of the adhesive 62 can be reduced. Since part of the mold 51 is bonded to the hydrophilic region Rh of the first surface 36*fa* which is visible from the outside of the liquid ejecting head 252, it is possible to reduce the occurrence of bonding failure of the mold 51, which is due to intrusion of air bubbles into the invisible mold 51 causing insufficient bonding between the mold 51, and the second surface 36*fb* or the lateral surface 36*s*.

According to the above embodiment, as illustrated in FIG. 6 and FIG. 7, the hydrophilic region Rh of the first surface 36*fa* is disposed between the water repellent region Rt and the lateral surface 36*s* so as to be adjacent to the lateral surface 36*s*. When the water repellent region Rt, the hydrophilic region Rh, and the water repellent region Rt are disposed in that order from the edges 36*p*1, 36*p*2 adjacent to the lateral surface 36*s* of the first surface 36*fa*, the distance from the lateral surface 36*s* to the hydrophilic region Rh is long, thus the amount of the mold 51 used increases, and the height of the mold is made higher. Meanwhile, according to the embodiment, the hydrophilic region Rh of the first surface 36*fa* is adjacent to the lateral surface 36*s*, thus the distance from the lateral surface 36*s* to the hydrophilic region Rh can be shortened while forming the hydrophilic region Rh with a certain area or more. Thus, the amount of the mold 51 used can be decreased, and the height of the mold 51 can be controlled. Since the amount of the mold 51 used can be decreased, it is possible to reduce the stress along the first surface 36*fa* caused by curing contraction of the portion of the mold 51, disposed between the lateral surface 36*s*, and at least one of the head chip Hn or the holder 33. Thus, the possibility of peeling off of the mold 51 from the first surface 36*fa* can be further reduced.

According to the above embodiment, the lateral surface 36*s* of the fixing plate 36 has water repellency. When a water repellent process is performed on the fixing plate 36 by dip coating, the water repellent film Ly is also formed on the lateral surface 36*s*. It tends to be difficult to remove a water repellent film on the lateral surface 36*s* having a small dimension in the Z direction, but even when the lateral surface 36*s* has water repellency, it is possible to inhibit intrusion of ink from the outside to the bond interface between the lateral surface 36*s* and the mold 51 by bonding part of the mold 51 to the hydrophilic region Rh of the first surface 36*fa*. In other words, it is possible to inhibit intrusion of ink from the outside to the bond interface between the lateral surface 36*s* and the mold 51 without removing the water repellent film on the lateral surface 36*s*.

B. Other Embodiments

B-1: Another Embodiment 1

Figure 8:
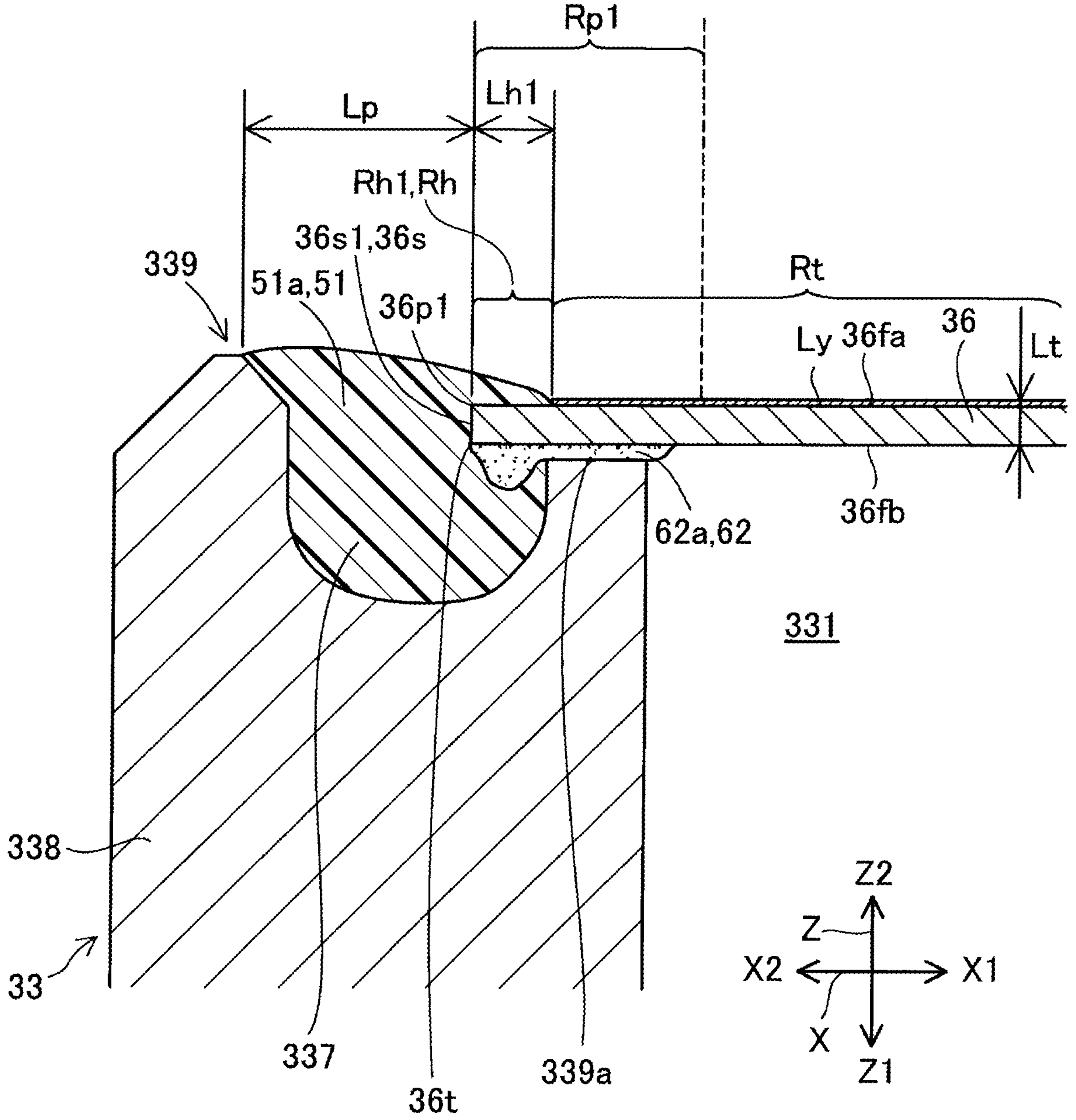
FIG. 8 is a view for explaining another embodiment 1.

In the above embodiment, as illustrated in FIG. 6, the first mold 51*a* is bonded not only to the first surface 36*fa*, but also to the second surface 36*fb*. However, other embodiments are not limited to this. FIG. 8 is a view for explaining another embodiment 1. The difference between the embodiment and another embodiment illustrated in FIG. 8 is that the first adhesive 62*a* has reached the edge 36*t*. Specifically, the first adhesive 62*a* is disposed on the entire region of the second surface 36*fb*, facing the groove 337. Consequently, part of the first mold 51*a* is not located on the second surface 36*fb*, and is not bonded to the second surface 36*fb*. Even in this configuration, the liquid resistance A1 of the first mold 51*a* is higher than the liquid resistance B1 of the adhesive 62, thus, it is possible to inhibit intrusion of liquid from the outside into the liquid ejecting head 252, and the adhesive 62 having a low liquid resistance can be protected.

B-2: Another Embodiment 2

Figure 9:
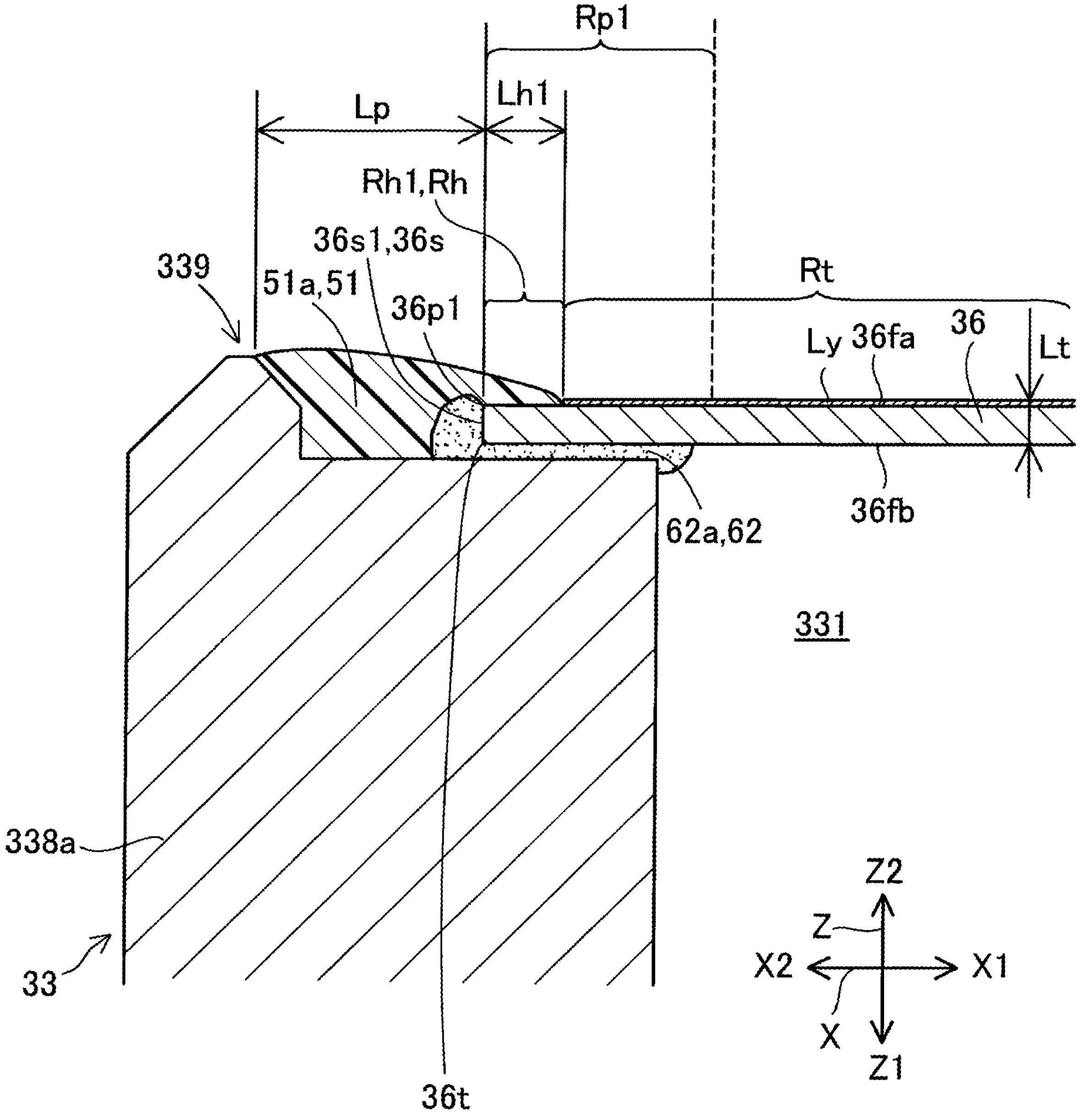
FIG. 9 is a view for explaining another embodiment 2.

FIG. 9 is a view for explaining another embodiment 2. The point of difference from the embodiment is that an outer peripheral wall 338*a* does not have the groove 337 illustrated in FIG. 6. Other components are the same as in the embodiment, thus the same components as in the embodiment are labeled with the same symbol, and a description is omitted as appropriate.

As illustrated in FIG. 9, the second surface 36*fb* of the fixing plate 36 is bonded to the bottom surface 339 of the outer peripheral wall 338*a* by the first adhesive 62*a*. Part of the first adhesive 62*a* is disposed protruding from the region between the second surface 36*fb* and the bottom surface 339. The first mold 51*a* is disposed between the outer peripheral surface 36*s*1 and the outer peripheral wall 338*a* of the holder 33 with the first adhesive 62*a* protruding over the first region Rh1 and the bottom surface 339 covered. Part of the first mold 51*a* is bonded to the first region Rh1. Even in this configuration, the same effects as that of the above embodiment are obtained because the same components as in the above embodiment are provided. For example, the bond strength between the first mold 51*a* and the first region Rh1 can be improved because the first region Rh1 has lower water repellency than the water repellent region Rt. Thus, it is possible to inhibit intrusion of the ink adhering to the first mold 51*a* into the bond interface between the first mold 51*a* and the outer peripheral surface 36*s*1, thus, it is possible to inhibit intrusion of the ink outside into the liquid ejecting head 252.

B-3: Another Embodiment 3

Figure 10:
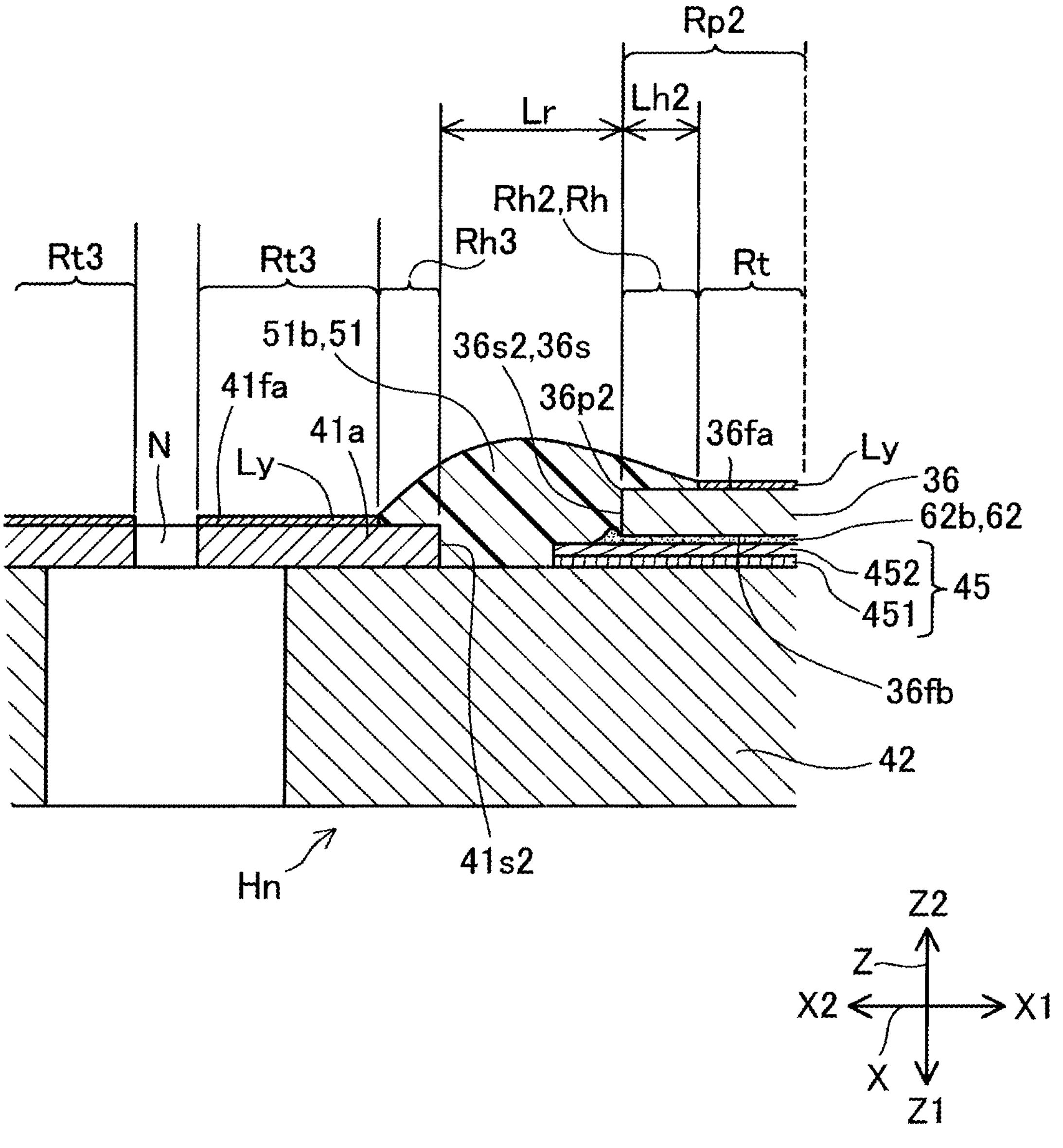
FIG. 10 is a view for explaining another embodiment 3.

FIG. 10 is a view for explaining another embodiment 3. The difference between another embodiment 3 and the embodiment illustrated in FIG. 7 is that part of the second mold 51*b* is bonded to surface 41*fa* of nozzle plate 41*a* in another embodiment 3. In the above embodiment, a water repellent film is formed on the entire surface 41*fa* of the nozzle plate 41, facing in the ejection direction to prevent ink adhesion. Meanwhile, in another embodiment 3, as with the first surface 36*fa* of the fixing plate 36, the surface 41*fa* of the nozzle plate 41*a* has a hydrophilic region Rh3 having low water repellency with the water repellent film Ly removed. Specifically, in a plan view as seen toward the first surface 36*fa*, the surface 41*fa* of the nozzle plate 41*a* includes: a nozzle formation region Rt3 having water repellency, in which a plurality of nozzles N are formed; and the hydrophilic region Rh3 disposed between the outer peripheral surface 41*s*2 of the nozzle plate 41*a* and the nozzle formation region Rt3. The hydrophilic region Rh3 has lower water repellency than the nozzle formation region Rt3. In another embodiment 3, the water repellency of the hydrophilic region Rh3 is made lower than the water repellency of the nozzle formation region Rt3 by removing the water repellent film Ly with a laser. Note that the outer peripheral surface 41*s*2 of the nozzle plate 41*a* is the lateral surface that defines the outer circumference of the nozzle plate 41*a*. Part of the second mold 51*b* is disposed in the hydrophilic region Rh3 of the nozzle plate 41*a*, and bonded to the hydrophilic region Rh3. In this manner, the adhesiveness between the second mold 51*b* and the nozzle plate 41*a* can be improved, thus, it is possible to inhibit intrusion of ink to the inside of the liquid ejecting head 252 through between the second mold 51*b* and the nozzle plate 41*a*.

B-4. Another Embodiment 4

According to the above embodiment, as illustrated in FIG. 6 and FIG. 7, the hydrophilic region Rh of the first surface 36*fa* is adjacent to the lateral surface 36*s*, but is not limited to thereto. For example, of the first surface 36*fa*, a region adjacent to the lateral surface 36*s* may be provided with a water repellent region, and the hydrophilic region Rh may be provided adjacent to the water repellent region. In other words, the hydrophilic region Rh may be disposed with a space from the first edge 36*p*1 or the second edge 36*p*2 of the first surface 36*fa*. Alternatively, part of the hydrophilic region Rh of the first surface 36*fa* may be adjacent to the lateral surface 36*s*, and the remaining part of the hydrophilic region Rh may be disposed with a space from the lateral surface 36*s*.

B-5. Another Embodiment 5

According to the above embodiment, as illustrated in FIG. 6 and FIG. 7, the lateral surface 36*s* is a surface extending in the Z direction, but is not limited thereto. For example, as seen in a direction perpendicular to the Z direction that is the thickness direction of the fixing plate 36, the lateral surface 36S may be an inclined surface or a curved surface extending in a direction intersecting the Z direction.

B-6. Another Embodiment 6

According to the above embodiment, the holder 33 is integrally formed, but may be formed by bonding two or more members with an adhesive.

C. Other Embodiments

The present disclosure is not limited to the above-described embodiments, and may be implemented in various forms in a range not departing from the gist of the present disclosure. For example, the present disclosure can be implemented in the following forms. The technical features of the above embodiments corresponding to the technical features in the aspects described below can be replaced, or combined as needed to cope with part or all of the problems of the present disclosure or to achieve part or all of the effects of the present disclosure. In addition, when technical features are not described as essential ones in the present specification, those technical features can be deleted as needed.

(1) According to a first aspect of the present disclosure, a liquid ejecting head is provided. The liquid ejecting head includes: a head chip configured to eject liquid in an ejection direction; a fixing plate having a first surface facing in the ejection direction, a second surface to which the head chip is fixed, and which is on an opposite side of the first surface, and a lateral surface that connects the first surface and the second surface; and a holder configured to hold the head chip between itself and the fixing plate. In a plan view as seen toward the first surface, the first surface includes a water repellent region having water repellency, and a hydrophilic region that is disposed between the water repellent region and the lateral surface, and has lower water repellency than the water repellent region, and part of mold is bonded to the hydrophilic region of the first surface, the mold being disposed between the lateral surface and at least one of the head chip or the holder. According to this aspect, part of the mold is bonded to the hydrophilic region of the first surface, thus, it is possible to inhibit intrusion of ink from the outside into the bond interface between the lateral surface and the mold.

(2) In the above aspect, the hydrophilic region of the first surface may be disposed between the water repellent region and the lateral surface so as to be adjacent to the lateral surface. When the water repellent region, the hydrophilic region, and the water repellent region are disposed in that order from the edge adjacent to the lateral surface of the first surface, the distance from the lateral surface to the hydrophilic region is long, thus the amount of the mold used increases, and the height of the mold tends to increase. Meanwhile, according to the aspect, the hydrophilic region of the first surface is adjacent to the lateral surface, thus the distance from the lateral surface to the hydrophilic region can be shortened. Thus, the amount of the mold used can be decreased, and the height of the mold can be controlled. Since the amount of the mold used can be decreased, it is possible to reduce the stress along the first surface caused by curing contraction of the portion of the mold, disposed between the lateral surface and at least one of the head chip or the holder. Thus, the possibility of peeling off of the mold from the first surface can be further reduced.

(3) In the above aspect, the lateral surface may have water repellency. According to the aspect, also when the lateral surface has water repellency, it is possible to inhibit intrusion of ink from the outside to the bond interface between the lateral surface and the mold by bonding part of the mold to the hydrophilic region of the first surface.

(4) In the above aspect, part of the mold may be bonded to the second surface. According to this aspect, the mold is present across both the first surface and the second surface, thus the bond strength between the fixing plate and the mold can be further improved.

(5) In the above aspect, the lateral surface may include an outer peripheral surface of the fixing plate, the mold may include a first mold disposed between the outer peripheral surface of the fixing plate and the holder, the hydrophilic region of the first surface may include a first region disposed along the outer peripheral surface of the fixing plate, and part of the first mold may be bonded to the first region. According to this aspect, the bond strength between the fixing plate and the mold can be improved by bonding part of the first mold to the first region which is a hydrophilic region.

(6) In the above aspect, the dimension of the first region in an arrangement direction of the lateral surface and the first region which are adjacent in the plan view may be greater than the thickness of the fixing plate. According to this aspect, the area of the first region to be bonded by the first mold can be increased, thus the bond strength between the first mold and the first region can be improved. Thus, it is possible to further inhibit intrusion of ink from the outside to the inside of the liquid ejecting head.

(7) In the above aspect, in an arrangement direction of the lateral surface and the first region which are adjacent in the plan view, the dimension of the first region may be less than the dimension of part of the first mold, the part being disposed between the lateral surface and the holder. When the portion of the mold, bonded to the fixing plate is wide, the possibility of peeling off of part of the mold from the first region may occur by a stress due to contraction of the mold at the time of curing thereof. Meanwhile, due to the above-mentioned relationship, the portion of the mold, bonded to the first region can be less affected by a stress due to contraction at the time of curing, thus the possibility of peeling off of part of the mold from the first region can be reduced. In addition, due to the above-mentioned relationship, the area of the first mold bonded to the first surface can be reduced, thus, to prevent drying of the ink in the nozzle, it is possible to sufficiently ensure the sealing area where the capping member covering the nozzle comes into contact with the first surface.

(8) In the above aspect, the second surface and the holder may be fixed by an adhesive disposed between the second surface and the holder, part of the first mold may be bonded to the second surface, and a liquid resistance of the first mold may be higher than a liquid resistance of the adhesive. According to this aspect, the first mold is disposed from the first surface to the second surface of the fixing plate, thus the bond strength between the fixing plate and the first mold can be further improved. In addition, the liquid resistance of the first mold is higher than the liquid resistance of the adhesive, thus, it is possible to inhibit intrusion of liquid from the outside into the liquid ejecting head, and the adhesive having a low liquid resistance can be protected.

(9) In the above aspect, the second surface and the holder may be fixed by an adhesive disposed between the second surface and the holder, part of the first mold may not be bonded to the second surface, and a liquid resistance of the first mold may be higher than a liquid resistance of the adhesive. According to this aspect, the liquid resistance of the first mold is higher than the liquid resistance of the adhesive, thus, it is possible to inhibit intrusion of liquid from the outside into the liquid ejecting head, and the adhesive having a low liquid resistance can be protected.

(10) In the above aspect, the holder may have an outer peripheral wall on a bottom surface facing in the ejection direction, the outer peripheral wall being fixed to the second surface by an adhesive, in the bottom surface of the outer peripheral wall, a groove may be formed at a position overlapping with the outer peripheral surface of the fixing plate in the plan view, and part of the first mold may be disposed inside the groove. According to this aspect, part of the first mold is disposed inside the groove, thus the contact area between the holder and the first mold can be increased, and therefore, the bond strength between the holder and the first mold can be improved.

(11) In the above aspect, the head chip may include a nozzle plate having a plurality of nozzles to eject liquid, the fixing plate may have an exposure opening for exposing the nozzle plate to an outside, the lateral surface may include an inner peripheral surface that defines the exposure opening of the fixing plate, the mold may include a second mold disposed between the inner peripheral surface and the nozzle plate, the hydrophilic region of the first surface may include a second region disposed along the inner peripheral surface, and part of the second mold may be bonded to the second region. According to this aspect, the bond strength between the fixing plate and the mold can be improved by bonding part of the second mold to the second region which is a hydrophilic region.

(12) In the above aspect, in an arrangement direction of the lateral surface and the second region which are adjacent in the plan view, the dimension of the second region may be greater than the thickness of the fixing plate. According to this aspect, the area of the second region to which the second mold is bonded can be increased, therefore, the bond strength between the second mold and the second region can be improved. Thus, it is possible to further inhibit intrusion of ink from the outside to the inside of the liquid ejecting head.

(13) In the above aspect, in an arrangement direction of the lateral surface and the second region which are adjacent in the plan view, the dimension of the second region may be less than the dimension of part of the second mold, the part being disposed between the lateral surface and the nozzle plate. When the portion of the mold, bonded to the fixing plate is wide, the possibility of peeling off of part of the mold from the second region may occur by a stress due to contraction of the mold at the time of curing thereof. Meanwhile, according to this aspect, the portion of the mold, bonded to the second region can be less affected by a stress due to contraction of the mold at the time of curing, thus the possibility of peeling off of part of the mold from the second region can be reduced.

(14) According to the above aspect, in the plan view, a surface of the nozzle plate may include a nozzle formation region having water repellency, in which a plurality of nozzles are formed, and a hydrophilic region having lower water repellency than the nozzle formation region, the hydrophilic region being disposed between an outer peripheral surface of the nozzle plate and the nozzle formation region, and part of the second mold may be disposed in the hydrophilic region of the nozzle plate. According to this aspect, the adhesiveness between the second mold and the nozzle plate can be improved.

(15) According to a second aspect of the present disclosure, a liquid ejecting apparatus is provided. The liquid ejecting apparatus includes: a liquid ejecting head in the above aspect; and a liquid reservoir configured to store liquid to be supplied to the liquid ejecting head. According to this aspect, part of the mold is bonded to the hydrophilic region of the first surface, thus, it is possible to inhibit intrusion of ink from the outside into the bond interface between the lateral surface and the mold.

The present disclosure can be implemented in various aspects other than those mentioned above. For example, the present disclosure can be implemented in the aspect of a liquid ejecting head or a method of manufacturing a liquid ejecting apparatus.

What is claimed is:

1. A liquid ejecting head comprising:

a head chip configured to eject liquid in an ejection direction;

a fixing plate having a first surface facing in the ejection direction, a second surface to which the head chip is fixed and which is opposite from the first surface, and a lateral surface that connects the first surface and the second surface; and a holder configured to hold the head chip between itself and the fixing plate, wherein in a plan view as seen toward the first surface, the first surface includes a water repellent region having water repellency, and a hydrophilic region that is disposed between the water repellent region and the lateral surface, and has lower water repellency than the water repellent region, and part of a mold is bonded to the hydrophilic region of the first surface, the mold being disposed between the lateral surface and at least one of the head chip or the holder.

2. The liquid ejecting head according to claim 1, wherein the hydrophilic region of the first surface is disposed between the water repellent region and the lateral surface so as to be adjacent to the lateral surface.

3. The liquid ejecting head according to claim 1, wherein the lateral surface has water repellency.

4. The liquid ejecting head according to claim 1, wherein part of the mold is bonded to the second surface.

5. The liquid ejecting head according to claim 1, wherein the lateral surface includes an outer peripheral surface of the fixing plate, the mold includes a first mold disposed between the outer peripheral surface of the fixing plate and the holder, the hydrophilic region of the first surface includes a first region disposed along the outer peripheral surface of the fixing plate, and part of the first mold is bonded to the first region.

6. The liquid ejecting head according to claim 5, wherein a dimension of the first region in an arrangement direction of the lateral surface and the first region which are adjacent in the plan view is greater than a thickness of the fixing plate.

7. The liquid ejecting head according to claim 5, wherein in an arrangement direction of the lateral surface and the first region which are adjacent in the plan view, a dimension of the first region is less than a dimension of part of the first mold, the part being disposed between the lateral surface and the holder.

8. The liquid ejecting head according to claim 5, wherein the second surface and the holder are fixed by an adhesive disposed between the second surface and the holder, part of the first mold is bonded to the second surface, and a liquid resistance of the first mold is higher than a liquid resistance of the adhesive.

9. The liquid ejecting head according to claim 5, wherein the second surface and the holder are fixed by an adhesive disposed between the second surface and the holder, part of the first mold is not bonded to the second surface, and a liquid resistance of the first mold is higher than a liquid resistance of the adhesive.

10. The liquid ejecting head according to claim 5, wherein the holder has an outer peripheral wall on a bottom surface facing in the ejection direction, the outer peripheral wall being fixed to the second surface by an adhesive, in the bottom surface of the outer peripheral wall, a groove is formed at a position overlapping with the outer peripheral surface of the fixing plate in the plan view, and part of the first mold is disposed inside the groove.

11. The liquid ejecting head according to claim 1, wherein the head chip includes a nozzle plate having nozzles configured to eject liquid, the fixing plate has an exposure opening for exposing the nozzle plate to an outside, the lateral surface includes an inner peripheral surface that defines the exposure opening of the fixing plate, the mold includes a second mold disposed between the inner peripheral surface and the nozzle plate, the hydrophilic region of the first surface includes a second region disposed along the inner peripheral surface, and part of the second mold is bonded to the second region.

12. The liquid ejecting head according to claim 11, wherein in an arrangement direction of the lateral surface and the second region which are adjacent in the plan view, a dimension of the second region is greater than a thickness of the fixing plate.

13. The liquid ejecting head according to claim 11, wherein in an arrangement direction of the lateral surface and the second region which are adjacent in the plan view, a dimension of the second region is less than a dimension of part of the second mold, the part being disposed between the lateral surface and the nozzle plate.

14. The liquid ejecting head according to claim 11, wherein in the plan view, a surface of the nozzle plate includes a nozzle formation region having water repellency in which nozzles are formed, and a hydrophilic region having lower water repellency than the nozzle formation region, the hydrophilic region being disposed between an outer peripheral surface of the nozzle plate and the nozzle formation region, and part of the second mold is disposed in the hydrophilic region of the nozzle plate.

15. A liquid ejecting apparatus comprising:

the liquid ejecting head according to claim 1; and a liquid reservoir configured to store liquid to be supplied to the liquid ejecting head.

* * * * *